D. H. ALLEN.
WHEEL.
APPLICATION FILED MAY 10, 1909.
944,532.
Patented Dec. 28, 1909.
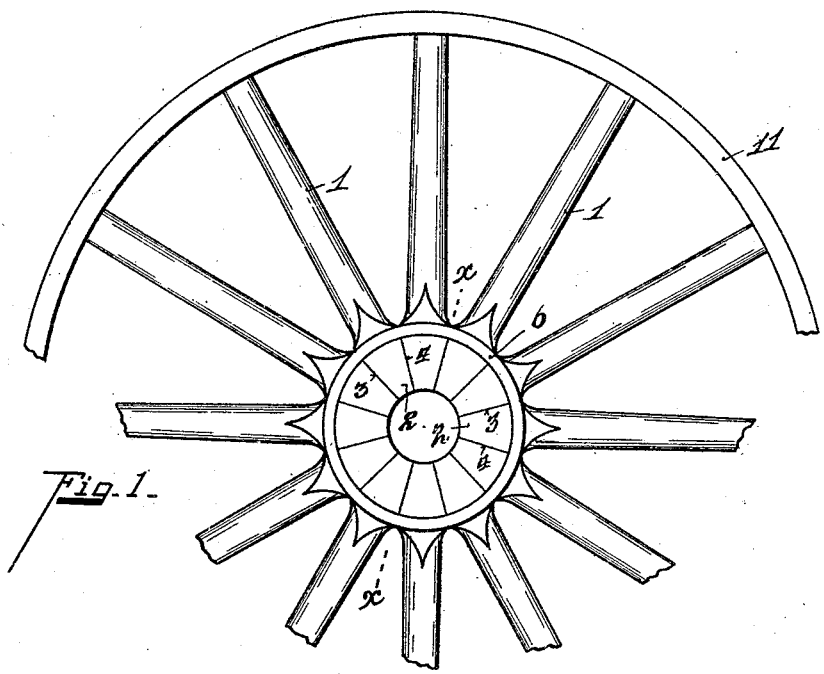
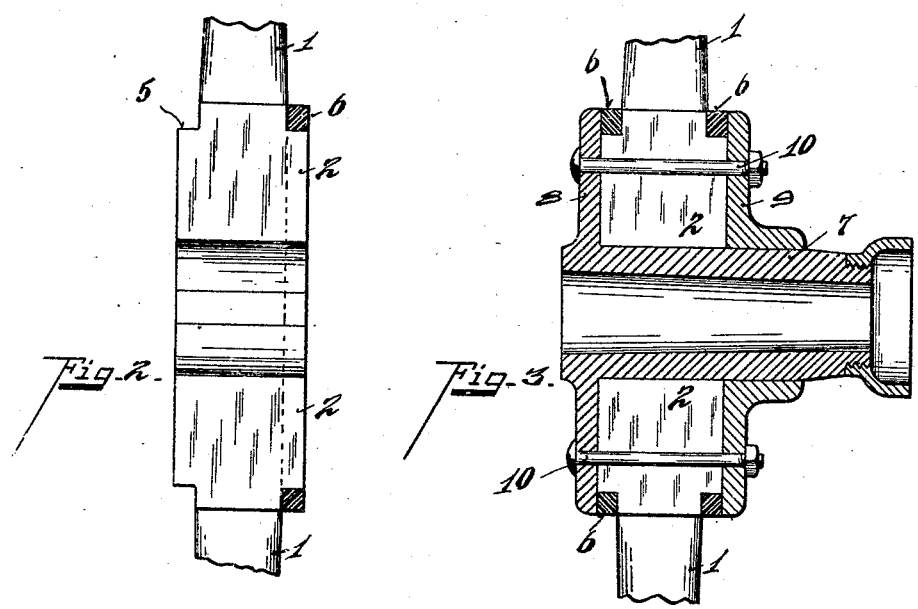
Witnesses
Olive B. Kaiser
Emma Spencer
Inventor
David H. Allen
By Wood & Wood
Attorneys

UNITED STATES PATENT OFFICE.

DAVID H. ALLEN, OF MIAMISBURG, OHIO.

WHEEL.

944,532.   Specification of Letters Patent.   Patented Dec. 28, 1909.

Application filed May 10, 1909. Serial No. 495,089.

*To all whom it may concern:*

Be it known that I, DAVID H. ALLEN, a citizen of the United States, residing at Miamisburg, in the county of Montgomery and State of Ohio, have invented certain new and useful Improvements in Wheels, of which the following is a specification.

My invention relates to an improved wheel.

The objects of the invention are to produce a stronger and cheaper wheel and also to simplify and cheapen the method of manufacture, producing at the same time a perfectly true wheel.

The features of my invention are more fully set forth in the description of the accompanying drawings, forming a part of this specification, in which:—

Figure 1 represents a side elevation. Fig. 2 is a section on line $x$, $x$, Fig. 1. Fig. 3 is a central vertical section through the hub.

1 represents a series of spokes, each having a thicker inner end 2 forming the opposite bevels 3, 4, which complete a circle when the spokes are assembled in radial form. The spokes are concentrically compressed in this form by any suitable compression arrangement, (not shown), operating on the outer ends of the spokes, and the inner ends are closely compacted together to form a hub from the inner ends of the spokes themselves, as shown in Fig. 1. While the spokes are tapered to fit under compression, the thickened ends 2 are faced by cutting away with a suitable tool, and at the same time form the shoulders or band seats 5, shown in Fig. 2. The bands 6 are then shrunk upon these seats 5, holding the spokes together in their compressed position. This hub is then reinforced by securing it between side flanges, the preferred form of which is illustrated in Fig. 3, in which 7 is a sleeve passed through the hub and having an integral flange 8 engaging one side of the hub and an annular superimposed flange member 9 slipped over the sleeve 7 and engaging the other side of the hub formed by the spokes, these members 8, 9, being laterally held together when clamped upon the hub by the bolts 10.

My improvement relates to that style of wheels known as artillery wheels commonly used for automobiles. As now made, the spokes are finished complete, before assembling, for the construction of the wheel. In constructing, the spokes are assembled, the fellies put on and compressed, bringing the spokes together in the center. While in this position, the hub and flange are bolted into place. Under this plan, the bevel on the end of each spoke, the length of each spoke, and the thickness of the felly must be exact before assembling the wheel, and the strength of the wheel depends upon the tire, felly and flanges bolted in the center to hold the spokes in position. That is, according to the present construction, the wheels are built from the outer circumference inwardly and the parts must be perfectly fitted before assembling. By my method, I bind the beveled ends of the spokes in the center, forming a hub from these inner ends of the spokes and thus hold the spokes securely in position independent of any other parts. By my method, the faces of the spokes in the center are not finished to exact size before assembling, it only being necessary that the bevels should be true so as to form a true circle when the spokes are radially assembled. The spokes are then assembled and concentrically compressed. While the inner ends of the spokes are thus compacted they are bored and faced, and at the same time the shoulders or band seats 5 may be formed. This is done in one operation. The rim or bands 6 are then shrunk upon these seats binding the spokes in position and forming the hub. If desirable, the band seats and bands may be formed with their inner diameters smaller than their outer diameters, so as to seat them with the bevel formation, preventing their lateral displacement. After the spokes are thus bound together, the ends of the spokes may be finished by revolving the wheel on its center, that is, the tenons formed on the end of the spokes in the usual manner.

11 represents the felly.

It will be observed that this method reverses the ordinary method, that is, the wheel is built from the center outwardly instead of from the circumference inwardly. The manufacture is very much simplified and a stronger wheel is produced.

Having described my invention, I claim:—

1. In a wheel, a series of spokes concentrically compressed together at their inner ends, a band secured upon a seat formed on the contacting ends of the spokes while held under compression and binding them securely together in wheel form, substantially as described.

2. A wheel composed of a series of spokes having thicker beveled inner ends compressed together concentrically, and a circumferential binding seated upon the contacted ends of the spokes while held under compression, substantially as described.

3. A wheel formed of a series of spokes having thicker beveled inner ends assembled and concentrically compressed, a seat being formed on each side of the thickened ends of the spokes while compressed, and a band shrunk upon each seat, thereby circumferentially binding the spokes together in their compressed position and forming a hub, substantially as described.

In testimony whereof, I have hereunto set my hand.

DAVID H. ALLEN.

Witnesses:
OLIVER B. KAISER,
EMMA SPENER.